(12) United States Patent
Buijsse et al.

(10) Patent No.: US 11,988,618 B2
(45) Date of Patent: May 21, 2024

(54) METHOD AND SYSTEM TO DETERMINE CRYSTAL STRUCTURE

(71) Applicant: FEI Company, Hillsboro, OR (US)

(72) Inventors: Bart Buijsse, Eindhoven (NL); Hans Raaijmakers, Eindhoven (NL); Peter Christiaan Tiemeijer, Eindhoven (NL)

(73) Assignee: FEI Company, Hillsboro, OR (US)

( * ) Notice: Subject to any disclaimer, the term of this patent is extended or adjusted under 35 U.S.C. 154(b) by 420 days.

(21) Appl. No.: 17/219,627

(22) Filed: Mar. 31, 2021

(65) Prior Publication Data

US 2022/0317067 A1 Oct. 6, 2022

(51) Int. Cl.
*G01N 23/2055* (2018.01)
*G01N 23/20025* (2018.01)
*G01N 23/207* (2018.01)

(52) U.S. Cl.
CPC ... *G01N 23/2055* (2013.01); *G01N 23/20025* (2013.01); *G01N 23/207* (2013.01); *G01N 2223/0565* (2013.01); *G01N 2223/102* (2013.01); *G01N 2223/604* (2013.01)

(58) Field of Classification Search
CPC ......... G01N 23/2055; G01N 23/20025; G01N 23/207; G01N 2223/0565; G01N 2223/102; G01N 2223/604
See application file for complete search history.

(56) References Cited

FOREIGN PATENT DOCUMENTS

| JP | 2004158366 A | 6/2004 |
|---|---|---|
| WO | 2016174707 | 11/2016 |

OTHER PUBLICATIONS

E. De La Mora, N. Coquelle, C.S. Bury, et al, Radiation damage and dose limits in serial synchrotron crystallography at cryo- and room temperatures, PNAS, Feb. 25, 2020, vol. 7, No. 8, 4142-4151.
EP22163248.2, Extended European Search Report, Sep. 5, 2022, 7 pages.
Kolb U., et al., "Automated Electron Diffraction Tomography—a New Tool for Nano Crystal Structure Analysis", Crystal Research and Technology, WILEY-VCH Verlag GmbH & Co. KGaA, Weinheim, vol. 46, No. 6, Apr. 1, 2011 (Apr. 1, 2011), pp. 542-554, XP071516462, ISSN: 0232-1300, DOI: 10.1002/CRAT.201100036.
Mastronarde D.N., et al., "Automated Electron Microscope Tomography Using Robust Prediction of Specimen Movements", Journal of Structural Biology, Academic Press, United States, vol. 152, No. 1, Oct. 1, 2005 (Oct. 1, 2005), pp. 36-51, XP027192977, ISSN: 1047-8477 [retrieved on Oct. 1, 2005].

*Primary Examiner* — Nicole M Ippolito
*Assistant Examiner* — Hanway Chang (57) ABSTRACT

Molecular structure of a crystal may be solved based on at least two diffraction tilt series acquired from a sample. The two diffraction tilt series include multiple diffraction patterns of at least one crystal of the sample acquired at different electron doses. In some examples, the two diffraction tilt series are acquired at different magnifications.

20 Claims, 5 Drawing Sheets

METHOD AND SYSTEM TO DETERMINE CRYSTAL STRUCTURE

FIELD OF THE INVENTION

The present description relates generally to methods and systems for crystallography, and more particularly, to determine a 3-dimensional electron potential map of the molecules that the crystal is composed of based on a tilt series of diffraction patterns of a crystal that span part of 3D reciprocal space of the crystal.

BACKGROUND OF THE INVENTION

Molecular structure of crystalline sample can be obtained by analyzing electron diffraction tilt series of crystals, that is, electron diffraction patterns acquired from various angles of the crystal. The electron diffraction tilt series may be acquired in the transmission mode, wherein electrons scattered from the crystal are acquired from the side opposite to the electron source. The angle between the crystal and the electron beam may be adjusted either by tilting the electron beam with a deflector or rotating the sample with a sample stage. The large dynamic range in intensity and spatial distribution of diffraction spots in the diffraction pattern may introduce difficulty to accurately collect diffraction tilt series.

SUMMARY

In one embodiment, a method comprises acquiring a first diffraction tilt series of a sample, wherein each diffraction pattern in the first diffraction tilt series has a first electron dose and a first magnification; acquiring a second diffraction tilt series of the sample, wherein each diffraction pattern in the second diffraction tilt series has a second electron dose and a second magnification; and solving molecular structure of a crystal based on the first diffraction tilt series and the second diffraction tilt series.

In another embodiment, a method comprises acquiring one or more first diffraction patterns of a crystal at a first electron dose; acquiring one or more second diffraction patterns of the crystal at a second electron dose; obtaining a high-resolution dataset based on the first diffraction patterns; obtaining a low-resolution dataset based on the second diffraction patterns; generating a merged dataset by combining the high-resolution dataset and the low-resolution dataset in a reciprocal space; and solving a molecular structure of the crystal based on the merged dataset. In this way, high quality diffraction patterns may be acquired for accurate crystal molecular structure analysis.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Like reference numerals refer to corresponding parts throughout the several views of the drawings.

DETAILED DESCRIPTION

Electron diffraction (ED) is a technique for determining the molecular (or atomic) structure of large (biological) molecules. In this technique, the molecule for which the structure is to be determined, is produced in relatively large amounts and then treated as to form a large crystal. The unit cells of this crystal are formed by this (biological) molecule. Because of the repetitive structure of the crystal, each inter-atomic distance present within the molecule will be repeated many times (as many times as the number of unit cells). These repeating distances act as a grating, thus diffracting part of the electron beam has a specific direction, whose magnitude corresponds to this interatomic distance according through Braggs' diffraction law. The direction of the scattering indicates the direction of this interatomic distance in the (biological) molecule. The intensity (or probability) of this scattering is proportional to the square of the number of electrons in the atoms (the atoms that correspond this distance) and roughly proportional to the fourth power of the scattering angle. The complete set of diffracted beams form a diffraction pattern in the back-focal plane of the first image lens of the electron microscope. This diffraction pattern is imaged on the microscope's camera/detector by properly adjusting the electron-optical lenses between the first imaging lens and the camera/detector.

The center of the diffraction pattern is formed by the undiffracted beam. Usually, the intensity in this central spot is much higher than in the neighboring diffracted spots. Cameras have a limited dynamic range between the minimum signal that can be detected in a pixel (e.g. 1 primary electron) and the maximum signal that can be detected in a pixel before this pixel saturates (e.g. 10,000 primary electrons). This dynamic range of the camera is generally not large enough to cover the huge difference in intensity (up to a factor 108) between the central spot and the weak diffraction spots. Therefore, in order to record the weak spots with sufficient accuracy, the central spot must be blocked in order not to oversaturate the camera. Such blocking can be done by the so-called 'beam stopper', which is a small needle that can be inserted in the electron beam and which is shaped such that it can precisely block the central part of the diffraction pattern.

The diffraction pattern shows a 2D projection of the 3D distribution of atomic distances in the (biological) molecule. In order to reconstruct the full 3D structure of the molecule, it is generally necessary to combine many of these 2D projections, each collected in a different projection direction (or with different incident angle). Such collection can be obtained in several ways, for example, by rotating the sample between different image collections. Alternatively, one can disperse many crystals across the sample, where each crystal has a different orientation, and collect images of each of these crystals.

Especially when multipole crystals are illuminated at the same time, each at its own orientation, it is desirable to record only the diffraction pattern of one single crystal. This can be done by properly applying a selecting aperture at an intermediate (usually the first) image plane of the sample. Such aperture is then called a selective area aperture, and the diffraction pattern is then called the selective area diffraction pattern. Often, the term 'selective area (electron) diffraction (pattern)' is also used when the selective area aperture is actually not used.

ED is used to resolve the molecular (or atomic) structure of the (biological) molecule at hand. Strictly speaking, ED does not resolve the positions of the atoms but the 3D map of the electric potential inside the molecule, since the electrons in the beam do not scatter on the atoms, but they scatter on the electric potential formed by the electrons bound to the atoms in the molecule. However, since this potential map is (almost) identical to the atomic structure, it is common to refer to ED as a method for resolving molecular structure.

The term 'crystal structure' is sometimes reserved for only referring to the structure and symmetry with which the unit cells are assembled in the crystal (e.g, hexagonal, or cubic, or orthorhombic). However, this term is also often used to refer to the structure inside the crystal, that is, to the molecular (or atomic) structure of the (biological) molecule at hand. In this document, we use the term 'crystal structure' to refer both to the packing of the unit cells as well as to the atomic structure inside the unit cell. We use the term 'molecular structure of the crystal' to refer to the molecular or atomic structure of the unit cell (that is, the (biological) molecule at hand) of which the crystal is made up.

Figure 2:
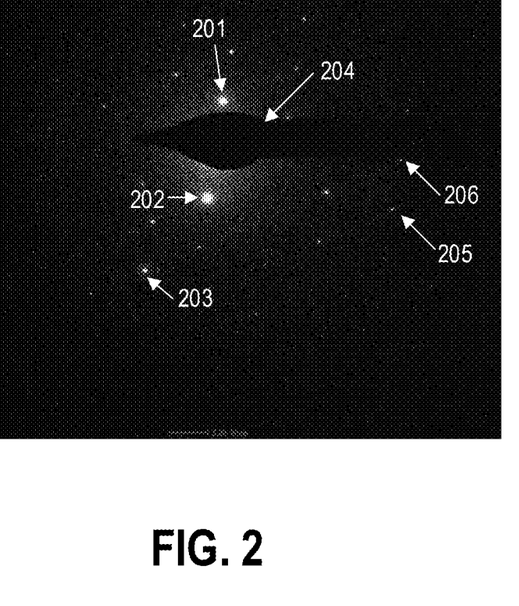
FIG. 2 is a selected area electron diffraction pattern.

The following description relates to systems and methods for determining structure of a crystal based on electron diffraction (ED) tilt series, that is, 3D ED patterns acquired from different angles of the crystal. For example, ED patterns of the crystal may be acquired while adjusting the angle of incidence of the electron beam by rotating the crystal with the sample stage and/or tilting the electron beam. In some examples, multiple crystals in a crystalline sample may be probed for ED pattern. Accurate acquisition of the intensity and the spatial distribution of the diffraction spots in the ED patterns is critical for the crystallographic analysis of structure. However, a dynamic range of the diffraction spot's intensity may exceed the dynamic range of the detector/camera. For selected area (SA) ED patterns, as shown in FIG. 2, some lower-resolution diffraction spots are blocked by the beam stopper, therefore not captured by the detector. These lower-resolution diffraction spots may be important for determining the structure of crystals with large unit cells, such as unit cells larger than 10 nm.

In order to address the above issues, methods and systems for determining the molecular structure based on 3D ED diffraction patterns are presented. The 3D ED patterns may include multiple ED tilt series acquired at different electron doses and/or under different magnification. The electron dose may have a unit of e/Å$^2$. The 3D ED diffraction patterns may be acquired with a transmission electron microscopy (TEM) system, such as the TEM system of FIG. 1. In one example, two diffraction tilt series may be constructed from the 3D ED patterns: a first diffraction tilt series including multiple ED patterns acquired at a first, higher, electron dose and a second diffraction tilt series including multiple ED patterns acquired at a second, lower electron dose. The first electron dose is just beneath the critical dose that causes radiation damage to the finer details of the molecules in the crystal.

The first and second diffraction tilt series may be acquired from one or more crystals of the sample. The electron dose may be adjusted while probing the same crystal or after probing multiple crystals. In one example, the first and second diffraction tilt series are acquired from a single crystal. The electron beam is directed to the crystal, and the first diffraction tilt series is acquired while rotating the crystal with a sample stage and/or tilting the electron beam with a deflector. After acquiring the first diffraction tilt series, the electron dose is adjusted from the first electron dose to the second electron dose, and the second diffraction tilt series of the same crystal is acquired while rotating the crystal with the sample stage and/or tilting the electron beam with the deflector. In another example, the sample includes multiple crystals. Similar to the previous example, multiple ED patterns of a first crystal are acquired at the first and second electron doses. Then, the electron beam is directed to a second crystal via beam shift or sample stage movement. Multiple ED patterns of the second crystal are acquired at the first and second electron doses. The first diffraction tilt series and the second diffraction tilt series can be constructed from the ED patterns of the first and second crystals based on the electron dose. In yet another example, the first diffraction tilt series is acquired by directing the electron beam to each of the multiple crystals. At each crystal location, one or more ED patterns at the first electron dose are acquired. Then, the second diffraction tilt series is acquired by directing the electron beam to each of the multiple crystals, and one or more ED patterns at the second electron dose are acquired at each crystal location. In some examples, all ED patterns of at least one crystal are acquired only at one electron dose. As such, the two diffraction tilt series may include ED patterns generated from different sub sets of crystals.

In this way, for each crystal, ED patterns of different doses are acquired, and the higher-dose ED pattern is acquired before the lower-dose ED pattern. The first electron dose is selected to ensure visibility of the higher-resolution diffraction spots in the higher-dose ED pattern. In one example, the first electron dose is 80%-100% of a critical dose. In another example, the first dose is 50%-100% of the critical dose. The critical dose is a dose that causes radiation damage to the finer details of the molecules in the crystal and substantially diminished intensity of the high-resolution spots in the diffraction pattern. The critical dose depends on the type of crystal. After acquiring the higher-dose ED pattern(s), the finer details (or structure) corresponding to the higher-resolution diffraction spots may be destroyed due to radiation damage. The lower resolution diffraction spots, which are more resistant to radiation damage, may be captured in the lower-dose ED pattern. Further, due to reduced electron dose, intensity of the lower-resolution diffraction spot in the lower-dose ED pattern can be accurately recorded without saturating the detector. In this way, diffraction spots of a large dynamic range can be recorded. The electron dose may be adjusted by adjusting on or more of the exposure time per frame and the dose rate. The dose rate may be adjusted by adjusting the settings of the illumination optics.

In some examples, ED patterns of the first diffraction tilt series are acquired at a first, lower, magnification using a smaller camera length, and ED patterns of the second diffraction tilt series are acquired at a second, higher, magnification using a larger camera length. Here 'camera length' refers to the magnification at the camera/detector from the back focal plane of the first image forming lens, multiplied by the focal distance of this first image forming lens. By adjusting the magnification, lower-resolution diffraction spots that are close to the center of the ED pattern in the first diffraction tilt series may spread out and be easily distinguished in the second diffraction tilt series. Further, the lower-resolution diffraction spots may be enlarged and occupy a larger number of pixels in the second diffraction tilt series, which further avoids detector saturation.

The molecular structure of a crystal may be obtained based on the first diffraction tilt series and the second diffraction tilt series. The molecular structure can be revealed as a 3D electron potential map of the molecule. In one example, a high-resolution dataset is obtained based on the first diffraction tilt series and a low-resolution dataset is obtained based on the second diffraction tilt series. The high-resolution dataset and the low-resolution dataset are merged in the reciprocal space. The molecular structure of the crystal is determined based on the merged dataset. The high-resolution and low-resolution dataset each includes a sorted list of reflections generated based on the respective diffraction tilt series and the known structural property (such as symmetry and shape) of the crystal. Combining the high-resolution dataset and the low-resolution dataset in the reciprocal space is advantageous compared to directly merging the diffraction tilt series by adding the ED patterns acquired at the same incident angle, because complicated image processing procedures, such as image correction and registration, for merging the ED patterns from different tilt series may be avoided. Further, ED patterns from different diffraction tilt series may correspond to different incident angles.

Figure 1:
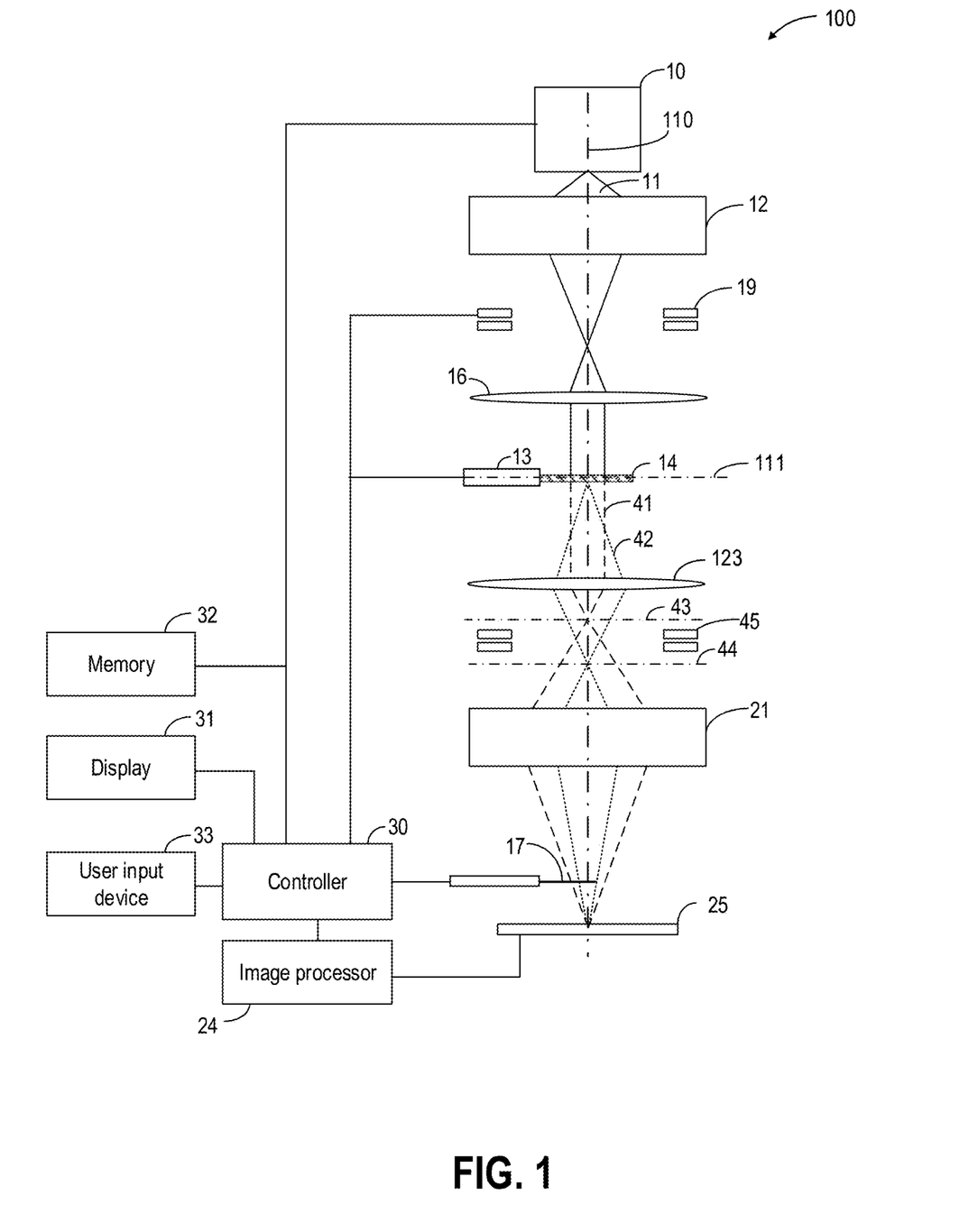
FIG. 1 illustrates an example transmission electron microscopy system.

Turning to FIG. 1, a transmission electron microscopy (TEM) system 100 is shown in different modes of operation. The TEM system 100 includes an electron source 10 that emits electron beam 11 along optical axis 110, towards condenser optics 12. The electron source 10 may generate high energy electrons, that is, electrons having typical energies of between about 10 keV and 1,000 keV. In some embodiments, the condenser optics 12 may include one or more condenser lenses and one or more apertures. Deflector 19 positioned downstream of the condenser optics 12 shifts and/or tilts the electron beam relative to the optical axis 110. Pre-sample objective lens 16 positioned downstream of the deflector 19 collimates the electron beam and directs the electron beam onto sample 14. The sample 14 may be held by sample stage 13 in a specimen plane 111. In some examples, the sample is positioned on a TEM grid attached to the sample stage. The sample stage 13 may adjust sample position by tilting the sample relative to the optical axis and/or translating the sample within the specimen plane. Scattered electrons transmitted through sample 14 sequentially pass through post-sample objective lens 123 and projector system 21 and are collected by detector 25 positioned on the opposite side of sample 14 relative to electron source 10. The projection system 21 is operated differently in the imaging mode and in the diffraction mode. The detector 25 may detect the received electrons and send the signal to image processor 24 to form an image. The detector 25 may include an amplifier for amplifying the signal before sending the signal to the image processor 24. In one example, the detector 25 may be a CCD camera or a CMOS camera. In some embodiments, different detectors may be used for diffraction pattern acquisition and sample image acquisition.

FIG. 1 shows the TEM system 100 operated in the SA imaging mode and the SA diffraction mode. Dashed lines 41 illustrate beam path of scattered electrons from sample 14 to detector 25 in the SA diffraction mode. In the SA diffraction mode, the projector system 21 images the back focal plane 43 of the post-sample objective lens 123 to detector 25. The beam stopper 17 is inserted into the optical axis 110 to block the unscattered beam. Dashed lines 42 illustrate beam path of scattered electrons from sample 14 to detector 25 in the SA imaging mode. In the SA imaging mode, the specimen plane 111 is imaged to the SA plane 44, and the projector system 21 images the SA plane 44 to detector 25. The beam stopper 17 is retracted from the optical axis 110. In one example, a SA aperture may be inserted in the beam path. The SA aperture may be the positioned in the SA plane 44. Alternatively, the SA aperture in the condenser optics 12 may serve as beam limiting aperture. In another example, an image deflector may be positioned between the sample and the detector for shifting and tilting the electrons transmitted through the sample back to the optical axis, so that the ED pattern stays centered on the detector during beam tilt and the image stays centered on the detector during beam shift. The image deflector 45 may be positioned between the back focal plane 43 and the SA plane 44. In some embodiments, the TEM system does not include the beam stopper and the detector receives the unscattered beam.

The controller 30 may control the operation of TEM system 100, either manually in response to operator instructions or automatically in accordance with computer readable instructions stored in non-transitory memory (or computer readable medium) 32. The controller 30 may include a processor and be configured to execute the computer readable instructions and control various components of the TEM system 100 in order to implement any of the methods described herein. For example, the controller may adjust the TEM system to operate in different modes by adjusting one or more of the apertures 18, the strength of the objective lens 123, the beam stopper 17, and the projector system 21. The controller 30 may adjust the beam location and/or the beam incident angle on the sample by adjusting the deflector 19. The controller 30 may adjust the electron dose of each ED pattern by adjusting on or more of the settings of the illumination optics, the exposure time of each frame acquired by the detector, and the angular speed for beam tilt/sample rotation. The controller 30 may adjust the magnification by adjusting projector system 21. The controller 30 may further be coupled to a display 31 to display notifications and/or signals detected by detector 25. The controller 30 may receive user inputs from user input device 33. The user input device 33 may include keyboard, mouse, or touchscreen. The controller may be configured to solve the molecular structure of the crystal based on the 3D ED diffraction patterns.

Though the TEM system is described by way of example, it should be understood that the sample image and diffraction pattern may be acquired with other charged particle microscopy systems. As another example, the charged particle microscopy system is a scanning transmission electron microscopy (STEM) system. Sample images can be made in scanning STEM mode, and diffraction images can be obtained with a (quasi) parallel beam. The present discussion of the TEM system is provided merely as an example of one suitable imaging modality.

FIG. 2 shows an example ED pattern acquired in SA diffraction mode at electron energy of 300 kV. Crystal lattice plane with relatively large separation (coarse details/structure) resulted in lower-resolution diffraction spots that locate closer to the center of the diffraction pattern, and closely spaced lattice planes (finer details/structure) of the crystal resulted in higher-resolution diffraction spots that locate farther from the center of the diffraction pattern. The shadow 204 at the center of the diffraction pattern is the shadow casted by the beam stopper (such as the beam stopper 17 of FIG. 1). The lower-resolution diffraction spots 201, 202 and 203 are saturated even when the higher resolution diffraction spots (such as diffraction spots 205 and 206) are weak.

Further, in some examples, lower resolution diffraction spots may be blocked by the beam stopper's shadow 204 and not recorded in the ED pattern.

Figure 3:
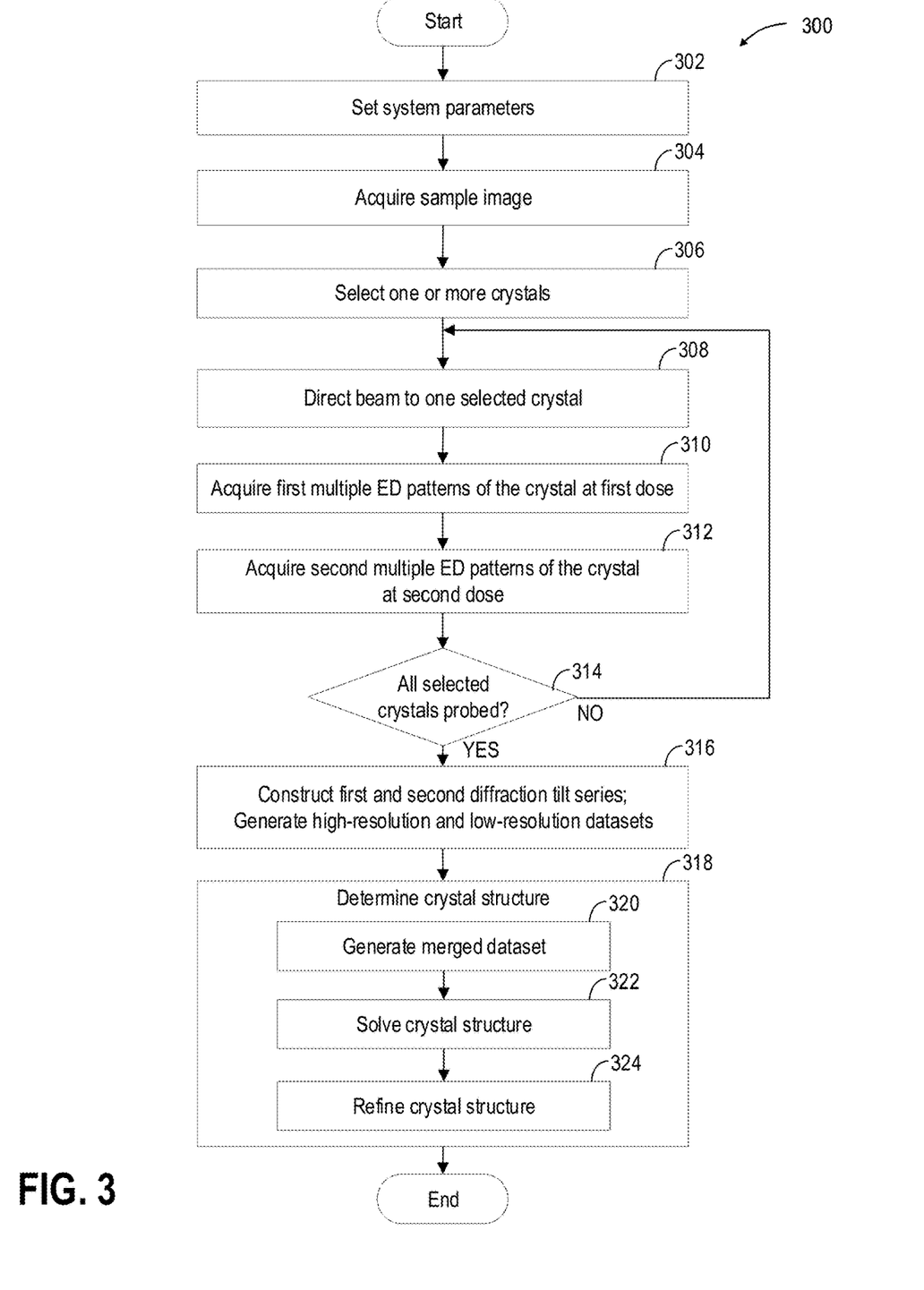
FIG. 3 shows a method for determining crystal structure based on diffraction tilt series.

FIG. 3 shows an example method 300 for determining crystal structure based on diffraction tilt series of different electron doses. The sample may include one or more crystals. After identifying the crystal(s) for ED pattern acquisition, at a location of each of the selected crystal, a first multiple ED patterns are acquired at a first electron dose. Then, a second multiple ED patterns are acquired for the same selected crystal. While acquiring each of the first and second multiple ED patterns, the incident angle is adjusted by beam tilt and/or sample rotation. The first and second diffraction tilt series are constructed from the ED patterns of the selected crystals based on the corresponding electron doses. The crystal structure is then determined based on the two diffraction tilt series.

At 302, parameters of the microscopy system are set. The parameters may include one or more of beam current, first and second electron doses, first and second magnifications, tilt parameters. Setting the first and second electron doses may include setting the electron dose rate and the frame time of the detector. The first electron dose may be determined based on the radiation damage threshold of the crystal. The first electron dose is set to be high so that the structures generated the higher-resolution spots are destroyed or nearly destroyed after acquiring the ED patterns. Setting the tilt parameters may include setting the angular step size and/or angular speed for beam tilt and/or sample rotation. The first and second magnification may be determined based on the size of the beam stopper and/or the prior knowledge of the size of the unit cell. For example, the second magnification is selected so that the diffraction spots needed to solve the 3D potential map are not blocked by the beam stopper. In one example, the second magnification is 5× of the first magnification.

At 304, one or more sample images of the region of interest (ROI) of the sample are acquired. The sample images are acquired in the imaging mode. The sample image may have a resolution at which the size and shape of the crystal can be determined. If the area of the ROI is greater than the field of view of a single sample image, multiple sample images may be stitched together to cover the ROI.

At 306, one or more crystals within the ROI are selected. The crystals may be selected based on one more of the size, distribution, morphology, and image contrast of the crystals in the sample image acquired at 304. In some examples, one or more particles in the sample image may be probed in the diffraction mode to determine whether the particle is a crystal. The particle may not be a crystal if the diffraction pattern does not show distinct diffraction spots. The non-diffracting particles are excluded from the selected crystals. Further, locations or coordinates of the selected crystals may also be determined based on the sample image.

At 308, the electron beam is directed towards one of the selected crystals via beam shift and/or sample stage shift in the specimen plane. The electron beam may be directed towards the crystal based on the coordinates of the selected crystals. The electron beam or the sample stage may alternatively or additionally be guided by real-time sample imaging.

At 310, the microscopy system is adjusted to the first, higher, electron dose. The magnification may also be adjusted to a first, lower, magnification. Multiple first ED patterns are acquired at different incident angles with different probing scheme. In one example, the ED patterns are acquired while rotating the sample continuously or incrementally via the sample stage. The crystal is positioned at the eucentric center of the sample stage. In another example, the ED patterns are acquired by tilting the electron beam via the beam deflector. In yet another example, the ED patterns are acquired with a combined beam tilt and sample rotation. For example, after rotating the sample at each larger angular step, the electron beam is tilted to acquire ED patterns covering finer angular steps. While acquiring the first multiple ED patterns, sample shift may be corrected, for example, based on sample images acquired in the imaging mode.

At 312, the microscopy system is adjusted to the second, lower, electron dose. The magnification may also be adjusted to the second, higher, magnification. The second magnification may be determined based on the size of the beam stopper, the first magnification, and prior knowledge of sample property. The sample property may include a range of unit cell size and possible distribution of diffraction spots. Multiple second ED patterns are acquired at different incident angles with the same probing schemes as 310. The data acquisition time for the first and second diffraction tilt series may be the same. The dose rate for the second diffraction tilt series may be lower than the first diffraction tilt series. The scanning parameters for the first and the second diffraction tilt series may be the same.

Figure 4A:
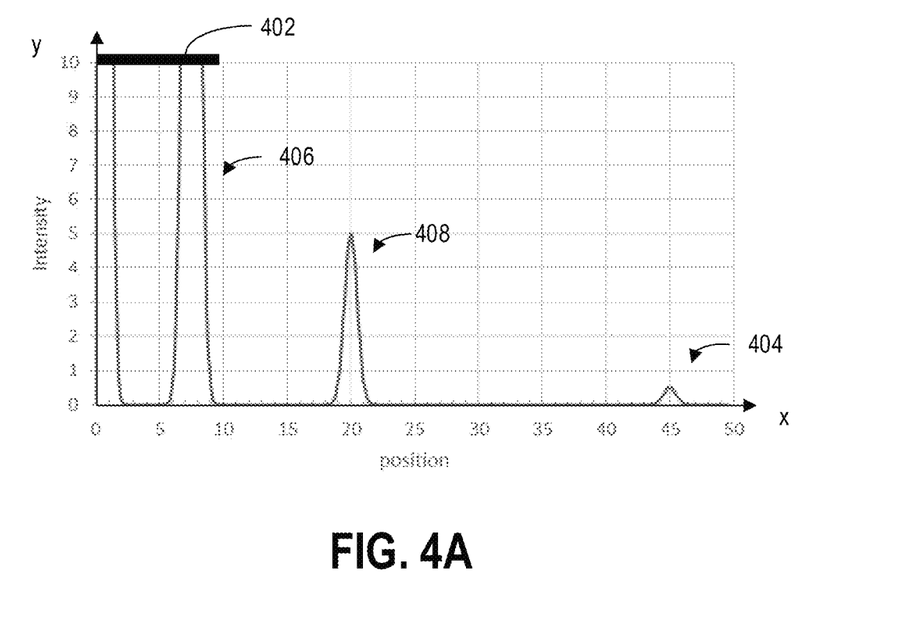
FIGS. 4A-4B illustrate changes of diffraction spots responsive to electron dose and magnification adjustments.
Figure 4B:
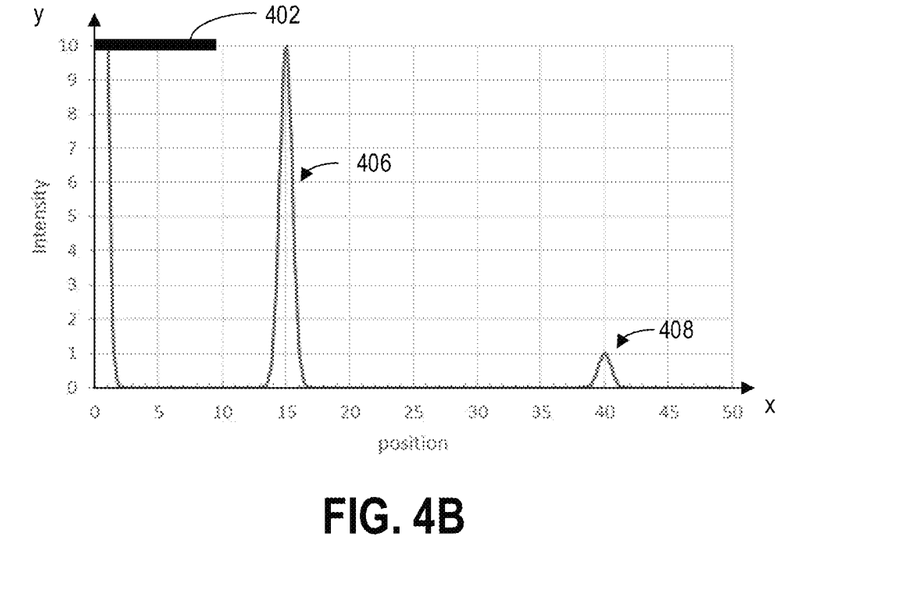

FIGS. 4A and 4B show the radial intensity distribution of ED patterns of the same crystal. The y-axis is the intensity, and the x-axis is the distance from the center of the ED pattern. FIG. 4A corresponds to a first ED pattern acquired at a higher electron dose and a lower magnification. FIG. 4B corresponds to a second ED pattern acquired at a lower electron dose and a higher magnification. At lower magnification, higher-resolution diffraction peak 404 can be captured in FIG. 4A. However, lower-resolution peak 406 is saturated in FIG. 4A due to high electron dose. Diffraction peak 408 moves farther from the ED pattern center with decreased magnification. The intensity of diffraction peak 408 also decreases with decreased electron dose. If the ED pattern is a SA diffraction pattern acquired with beam stopper 402, the lower-resolution diffraction peak 406 cannot be captured in the first ED pattern. By increasing the magnification, lower-resolution peak 406 is no longer blocked by beam stopper 402 in FIG. 4B. Further, with reduced electron dose, lower-resolution peak 406 is not saturated in FIG. 4B. By acquiring both the first and second ED patterns of the same crystal, the diffraction spots with large dynamic range of intensity and resolution distribution can be captured.

Turning back to FIG. 3, at 314, method 300 checks whether ED patterns of all selected crystals have been acquired. If the answer is NO, the electron beam is directed to the next selected crystal at 308. Otherwise, method 300 proceeds to 316.

At 316, the first and second diffraction tilt series are constructed based on the first multiple ED patterns and the second multiple ED patterns of the selected crystals. In one example, the first diffraction tilt series includes all the first multiple ED patterns acquired at the first dose, and the second diffraction tilt series includes all the second multiple ED patterns acquired at the second dose. A high-resolution dataset and a low-resolution dataset are generated based on the first and second diffraction tilt series. For each ED pattern in the tilt series, unit cell parameters and/or correlation of the intensities may be compared to determine whether (part of) these patterns should be considered useful data or outliers. For example, ED pattern from a damaged crystal and/or ED pattern differs too much from ED pattern acquired from adjacent tilt angles are removed from the diffraction tilt series. Obtaining the dataset may include 3D integrating intensities of each diffraction spot in the diffraction tilt series, scaling the integrated intensities based on the electron dose, applying corrections (e.g. Lorentz factor, absorption correction) and generating a sorted list of reflections based on the integrated intensities and known structural property (such as symmetry and shape) of the crystal. For example, each reflection has an index (h, k, l), an intensity, and a standard deviation of the intensity.

At 318, the crystal structure is determined based on the high-resolution and the low-resolution datasets. In one example, a merged dataset is obtained based on the high-resolution and the low-resolution dataset at 320. The high-resolution and low-resolution datasets may be scaled such that after corrections, intensity differences between identical reflections (i.e. with the same index) from different measurements (such as from different tilt series) and all their symmetry related equivalents are minimized.

At 322, the crystal structure can be determined based on the merged dataset using conventional crystallography software packages. At 324, the crystal structure is refined using the merged dataset, to optimize the atom locations, while fitting other parameters e.g. to describe disorder and twinning, using conventional crystallography software packages.

Figure 5:
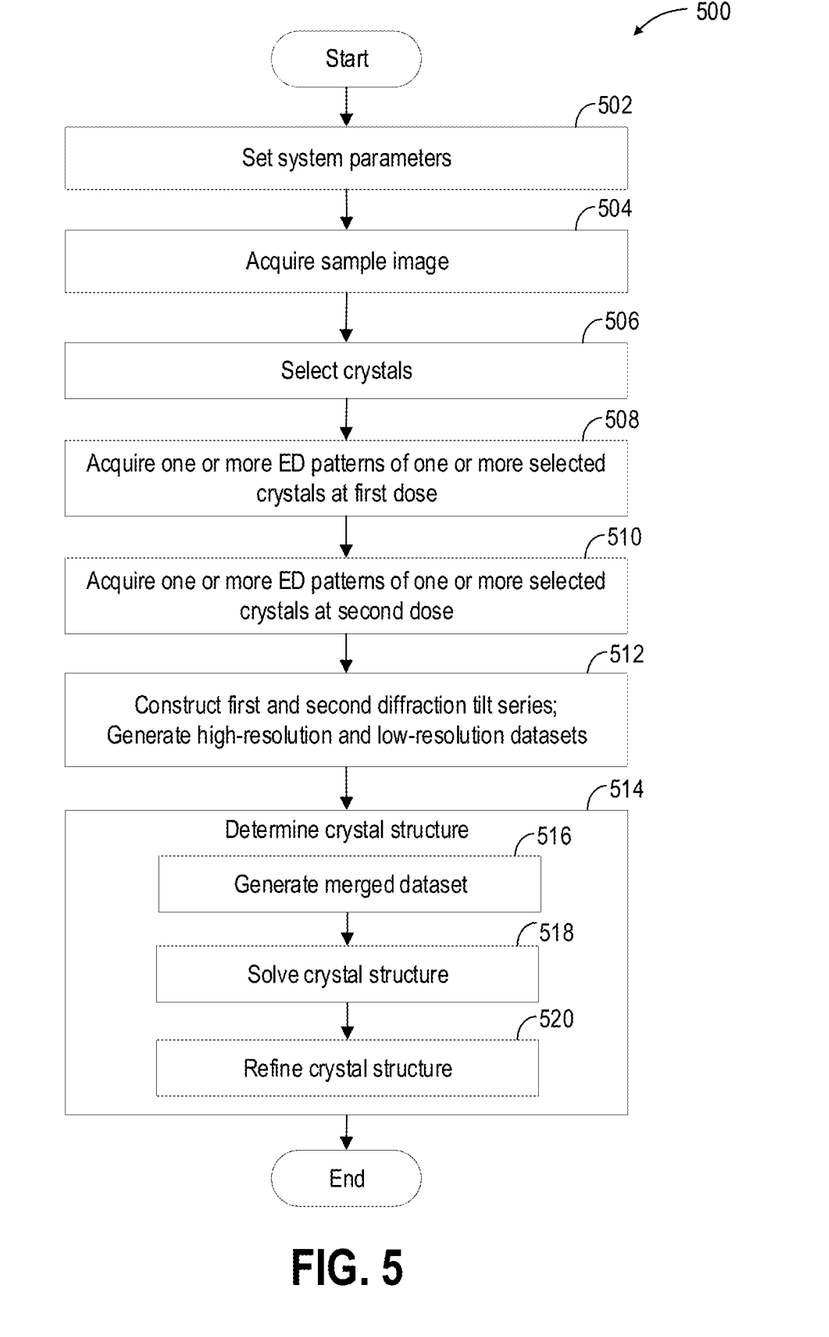
FIG. 5 shows another method for determining crystal structure based on diffraction tilt series.

FIG. 5 shows another example method 500 for determining crystal structure based on diffraction tilt series acquired at different electron doses. Multiple selected crystals within the ROI are scanned multiple times with different electron doses. Within each scan, one or more ED patterns are acquired from each crystal at the same electron dose. Different from method 300, wherein the electron dose is adjusted while probing one crystal before moving on to the next crystal, method 500 acquires ED patterns of multiple crystals at a first electron dose and then acquires ED patterns of the multiple crystals at a second electron dose.

At 502, system parameters are set. Similar to 302 of method 300, the system parameters may include one or more of beam current, first and second electron doses, first and second magnifications, and tilt parameters.

At 504 and 506, similar to 304 and 306 of method 300, sample image is acquired, and one or more crystals are selected based on the sample image.

At 508, the microscopy system is set to acquire ED patterns at the first, higher, electron dose. The microscopy system may also be adjusted to the first, lower, magnification. The electron beam is directed to one or more selected crystal via beam shift and/or sample stage translation in the specimen plane, one or more ED patterns of the crystal are acquired.

At 510, the microscopy system is set to acquire ED patterns at the second, lower, electron dose. The microscopy system may also be adjusted to the second, higher, magnification. The electron beam is directed to one or more selected crystal via beam shift and/or sample stage translation in the specimen plane, one or more ED patterns of the crystal are acquired. Crystals probed at 508 and 510 may belong to different subsets of the selected crystals.

At 512, the first and second tilt series are constructed. The first tilt series may be constructed based on the ED patterns acquired at 508, and the second tilt series may be constructed based on the ED patterns acquired at 510. Further, a high-resolution dataset and a low-resolution dataset are generated based on the first and second tilt series respectively.

At 514, similar to 318 of method 300, crystal structure is determined based on high-resolution and low-resolution datasets.

In this way, diffraction spots with wide range of intensity and resolution can be captured. Complicated crystal structure may be accurately determined based on the multi-dose and/or multi-magnification diffraction tilt series.

The technical effect of acquiring ED patterns of the same crystal at different doses is that the dynamic range of the captured signal intensity may be larger than the dynamic range of the detector. The technical effect of acquiring ED patterns of the same crystal at different magnifications is that spatially resolved higher-resolution and lower-resolution diffraction spots can be acquired. Further, diffraction spots blocked by the beam stopper may be captured. The technical effect of solving the high-resolution dataset and the low-resolution dataset in the reciprocal space is that complicated imaging processing procedures for directly merging the higher and lower resolution ED patterns can be avoided.

What is claimed is:

1. A method, comprising:
acquiring a first diffraction tilt series of a sample, wherein each diffraction pattern in the first diffraction tilt series has a first electron dose and a first magnification;
acquiring a second diffraction tilt series of the sample, wherein each diffraction pattern in the second diffraction tilt series has a second electron dose and a second magnification; and
solving a molecular structure of a crystal based on the first diffraction tilt series and the second diffraction tilt series.

2. The method of claim 1, wherein the first electron dose is higher than the second electron dose, and the first magnification is lower than the second magnification.

3. The method of claim 2, wherein a beam stopper is used while acquiring the first diffraction tilt series and the second diffraction tilt series, and the method further comprising adjusting the first magnification to the second magnification based on a size of the beam stopper.

4. The method of claim 2, further comprising adjusting the first magnification to the second magnification based on unit cell size.

5. The method of claim 1, wherein solving a molecular structure of a crystal based on the first diffraction tilt series and the second diffraction tilt series includes: obtaining a high-resolution dataset based on the first diffraction tilt series; obtaining a lower-resolution dataset based on the second diffraction tilt series; obtaining a merged dataset by combining the higher-resolution dataset with the lower-resolution dataset in a reciprocal space; and solving the molecular structure based on the merged dataset.

6. The method of claim 1, wherein acquiring the first diffraction tilt series includes acquiring multiple diffraction patterns of a first crystal of the sample at the first electron dose by adjusting an angle between the first crystal and an electron beam, wherein acquiring the second diffraction tilt series includes acquiring multiple diffraction patterns of the first crystal at the second electron dose by adjusting the angle between the first crystal and the electron beam.

7. The method of claim 6, wherein the second diffraction tilt series is acquired after acquiring the first diffraction tilt series.

8. The method of claim 6, wherein the angle between the first crystal and the electron beam are adjusted by tilting the electron beam and/or rotating a sample stage for holding the sample.

9. The method of claim 6, wherein acquiring the first diffraction tilt series further includes acquiring multiple diffraction patterns of a second crystal of the sample at the first electron dose by adjusting an angle between the second crystal and the electron beam, and acquiring the second diffraction tilt series further includes acquiring multiple diffraction patterns of the second crystal at the second electron dose by adjusting the angle between the second crystal and the electron beam.

10. The method of claim 1, wherein the sample includes multiple crystals, and wherein acquiring the first diffraction tilt series includes directing an electron beam towards one or more of the multiple crystals and acquire one or more diffraction patterns for each of the multiple crystals, and acquiring the second diffraction tilt series include directing the electron beam towards one or more of the multiple crystals and acquire one or more diffraction patterns for each of the multiple crystals.

11. The method of claim 1, wherein a data acquisition time for the first diffraction tilt series is the same as a data acquisition time for the second diffraction tilt series.

12. A method, comprising:
acquiring one or more first diffraction patterns of a crystal at a first electron dose;
acquiring one or more second diffraction patterns of the crystal at a second electron dose;
obtaining a high-resolution dataset based on the first diffraction patterns;
obtaining a low-resolution dataset based on the second diffraction patterns;
generating a merged dataset by combining the high-resolution dataset and the low-resolution dataset in a reciprocal space; and
solving a molecular structure of the crystal based on the merged dataset.

13. The method of claim 12, wherein the second diffraction patterns are acquired after the first diffraction patterns, and the first electron dose is higher than the second electron dose.

14. The method of claim 12, wherein the first diffraction patterns are acquired at a magnification lower than a magnification of the second diffraction patterns.

15. A system, comprising:
an electron source for generating an electron beam along an optical axis;
a sample stage for holding a sample and adjusting a sample position;
a detector for detecting electrons transmitted through the sample; and
a controller including a non-transitory memory for storing computer readable instructions, wherein by executing the computer readable instructions, the controller is configured to:
acquire a first diffraction tilt series of the sample, wherein each diffraction pattern in the first diffraction tilt series has a first electron dose and a first magnification;
acquire a second diffraction tilt series of the sample, wherein each diffraction pattern in the second diffraction tilt series has a second electron dose and a second magnification; and
solve a molecular structure of a crystal of the sample based on the first diffraction tilt series and the second diffraction tilt series.

16. The system of claim 15, wherein the first electron dose is higher than the second electron dose, and the first magnification is lower than the second magnification.

17. The system of claim 15, wherein the first diffraction tilt series and the second diffraction tilt series are acquired by rotating the sample stage relative to the electron beam at a same rotation speed.

18. The system of claim 15, wherein solve a molecular structure of a crystal based on the first diffraction tilt series and the second diffraction tilt series includes: obtain a high-resolution dataset based on the first diffraction tilt series; obtain a lower-resolution dataset based on the second diffraction tilt series; obtain a merged dataset by combining the higher-resolution dataset with the lower-resolution dataset in a reciprocal space; and solve the molecular structure based on the merged dataset.

19. The system of claim 15, further including a beam stopper for acquiring the first diffraction tilt series and the second diffraction tilt series, and wherein a magnification is adjusted based on a size of the beam stopper.

20. The system of claim 15, wherein a magnification is adjusted based on a unit cell size of the crystal.

* * * * *